United States Patent Office 3,404,957
Patented Oct. 8, 1968

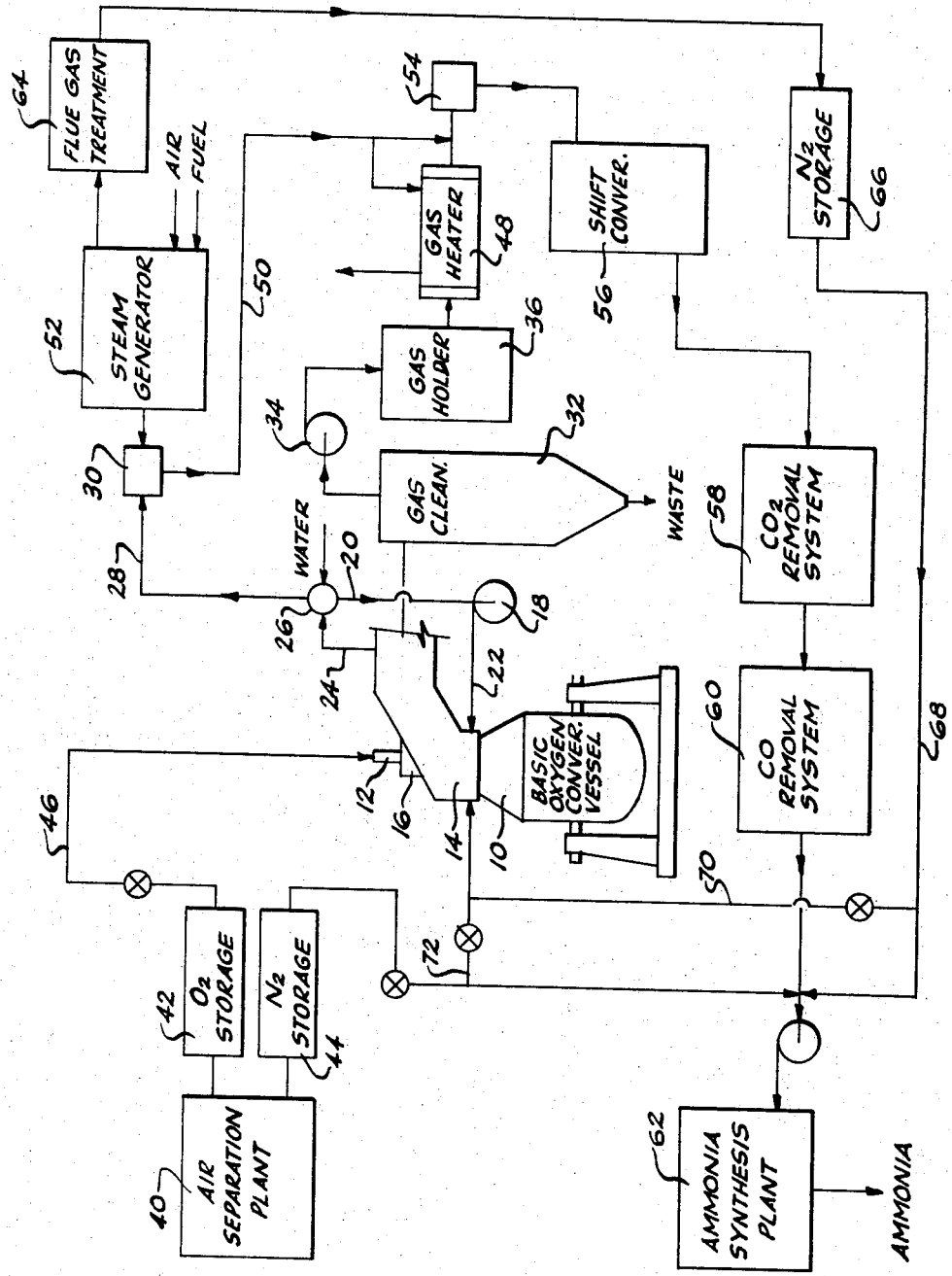

3,404,957
AMMONIA SYNTHESIS
Henry J. Blaskowski, Simsbury, Conn., assignor to Combustion Engineering, Inc., Windsor, Conn., a corporation of Delaware
Filed Apr. 20, 1966, Ser. No. 543,994
8 Claims. (Cl. 23—198)

ABSTRACT OF THE DISCLOSURE

A process and system for producing ammonia in which the nitrogen is obtained from an air separation process and in which the hydrogen is obtained from a metal refining process which utilizes oxygen also from the air separation process and which produces CO gas which is reacted with water to produce the hydrogen gas for reaction with the nitrogen.

---

This invention relates to ammonia synthesis and more particularly to an ammonia synthesis process integrated with a metal refining process and an air separation process which produces oxygen for the metal refining and nitrogen for the ammonia synthesis.

Basic oxygen metal refining and steel making processes have become quite popular in recent years and a number of these basic oxygen or oxygen top blowing converters are now in operation. The basic procedure in the operation of this process is to direct a stream or jet of relatively pure oxygen onto the surface of a pool of molten metal contained in a converter vessel whereby the oxygen reacts either directly or indirectly with the impurities, the metal and the carbon present. The reaction of the carbon with oxygen or oxides forms large quantities of CO gas which may be recovered.

Basic oxygen converter vessels currently being installed have capacities up to 300 tons of steel per heat while vessels of larger capacity are under consideration. The vessels are normally installed in sets of two or three. Two vessel shops indicate a capability of producing about 30 heats per day while three vessel shops may turn out over 50 heats per day. Such large systems require great quantities of oxygen and it is the practice to install an air separation plant at or near the steel mill site. The air separation plant would of course produce large quantities of nitrogen in addition to the oxygen separated for the basic oxygen process. It is the purpose of the present invention to take advantage of this available nitrogen supply and the available CO gas supply to produce ammonia. This is accomplished by means of the conventional CO gas shift reaction in which the CO is reacted with steam to produce hydrogen and $CO_2$. The hydrogen is then separated from the $CO_2$ and reacted with nitrogen in a conventional ammonia synthesis process.

An object of the present invention is therefore to provide a novel system and process for producing ammonia.

A more specific object of the invention is to provide a system and process for utilizing the waste gases from a basic oxygen conversion process and the nitrogen produced in conjunction with the production of oxygen for the basic oxygen process to form ammonia.

Further objects as well as the advantages of the invention will become even more apparent from the following description of an illustrative embodiment of the invention when read in conjunction with the accompanying drawing which is a flow diagram of the inventive process and system.

The vessel 10 of the present invention is of the conventional basic oxygen converter design and is operated as taught, for example, in the Suess et al. U.S. Patent 2,800,631, which issued July 23, 1957. The oxygen is blown into the vessel 10 by means of the oxygen lance 12 which directs the oxygen in a rather concentrated stream onto the surfaces of the molten metal at the center of the pool. The oxygen, in addition to reacting with the impurities in the metal to form slag, also reacts with the carbon to form oxides of carbon; up to 90% may be CO while the remainder is $CO_2$. The oxygen utilization factor is quite high meaning that little unreacted oxygen is exhausted from the converter and that the off-gas is primarily CO.

Since the basic oxygen conversion process is a batch operation, and the CO gas shift reaction is advantageously carried on as a continuous process, it is desirable, if not necessary, to feed the off-gas from the basic oxygen converter to storage means from which it may be fed to the shift converter. Also, the CO content of the off-gas varies throughout the period of a blow while the storage means provides a feed gas for the shift converter with a relatively constant composition. In order to store the off-gas, it is first necessary to collect the gas from the mouth of the converter vessel. Many designs for fume hoods for this purpose have been devised. See, for example, U.S. Patents 2,855,292 and 3,149,191 and 3,154,406 and 3,173,489 and 3,177,065 as well as British Patent 877,046. As these patents point out, it is necessary to exclude air from or limit the air entering the fume hood which would otherwise oxidize the CO to $CO_2$. These patents describe various types of fume hoods and sealing means such as the inert gas (nitrogen) seal mentioned in Patents 3,173,489 and 3,177,065 and the steam seal of British Patent 877,046. Patent 3,154,406 described an arrangement wherein the pressure in the hood is regulated and maintained at a value near atmosphere so as to limit the air which enters the hood. Fume hood 14 of the present invention is provided for this purpose. The oxygen lance 12 extends into the vessel 10 through the hood 14 and suitable sealing means 16.

The off-gases from the basic oxygen vessel may be at about 1500 to 1800° C. and thus contain significant quantities of sensible heat which can be recovered. The hood 14 is therefore provided with cooling means for extracting the heat although this feature is optional. The illustrated cooling means is a water (or steam) cooling system with the pump 18 circulating water through lines 20, 22 and 24 to the steam drum 26. Steam leaves drum 26 via line 28 and it may be used later in the system or for any other desired purpose. Since the basic oxygen process is a batch process, the steam production will be intermittent. It therefore may be desirable to feed the steam to an accumulator 30 from which a steady steam supply may be withdrawn.

The gases coming from the converter vessel contain considerable solid contaminates which should be separated prior to storage. For this purpose a gas cleaner 32 is provided which may be of any suitable design. See for example the previously cited Patents 2,855,292 and 3,177,065. This later patent also illustrates a water cooled fume hood. The gas from the cleaner 32 is then pumped or blown by blower 34 into the gas holder 36. The off-gas from several basic oxygen vessels may be fed to a single gas holder, if desired.

The oxygen for the basic oxygen process is extracted from air in the air separation plant 40. This air separation plant may be of any type capable of separating the oxygen and nitrogen from the air and providing a relatively pure supply of each. The most conventional system would of course be an air liquefaction process such as that illustrated on page 131 of "Chemical Process Industries" by R. Norris Shreve, McGraw-Hill Book Company, Inc., 1945. The oxygen and nitrogen output of the process are stored in storage means 42 and 44 respectively. The oxygen is then fed when required through line 46 to the oxygen lance 12.

The apparatus and processes described thus far are conventional as indicated by Patents 2,855,292 and 3,177,065. The present invention goes on, however, to make economical use of the off-gas in holder 36 and the by-product nitrogen in holder 44. The off-gas from holder 36 is fed to a heater 48 wherein the gas is heated to the temperature necessary for the shift conversion reaction. The heat for the gas heater may be furnished at least in part by the steam from the fume hood 14.

The effluent heated gas from heater 48 is mixed with steam from line 50. Since the steam from the fume hood would probably not be adequate, steam generator 52 is provided to supply the additional steam necessary. Of course, the steam generator 52 may be the sole source of steam in the event that no steam is generated in the fume hood.

The heated mixture of off-gas and steam is next fed to sulfur removal means 54 for the purpose of protecting the catalysts in the shift converter from sulfur poisoning. This sulfur removal means may be merely a small bed of zinc oxide.

The desulfurized mixture of steam and converter off-gas is then fed to the shift converter 56 in which the following reaction takes place:

$$CO + H_2O \rightleftharpoons CO_2 + H_2$$

This catalyst promoted, exothermic reaction has an equilibrium constant $$K = \frac{(CO_2)(H_2)}{(CO)(H_2O)}$$

which is not favored by high temperatures. The reaction rate, on the other hand, is favored by increased temperatures. It is therefore a common practice, which may be incorporated into the present invention, to employ perhaps two separate shift converter reactors. The first reactor or converter section employs a high temperature catalyst such as chromium promoted iron oxide catalyst with an inlet gas temperature of perhaps 700° F. to rapidly convert the bulk of the CO. The exit gas from this first section is then cooled to about 450° F. and fed to the second converter section containing a copper base catalyst in which a majority of the remaining CO is converted. These shift converters and catalyst are all items that are commercially available and therefore no further details are necessary.

The reaction products from the shift converter contain $CO_2$ and a small percentage of CO which must be removed prior to the production of ammonia. The gases are therefore fed successively to a $CO_2$ removal system 58 and a CO removal system 60. Such systems are conventional as is illustrated on pages 397–400 of the previously mentioned book "Chemical Process Industries." Other systems could also be employed such as the "Benfield" process for $CO_2$ removal which utilizes a hot potassium carbonate solution containing an organic activating agent and the methanation process for CO removal. This methanation will also react any residual $CO_2$.

The effluent gases from the carbon oxide removal systems are next combined with the proper amount of nitrogen from storage tank 44 and fed to the ammonia synthesis plant 62. The ammonia synthesis plant may be of conventional design of which there are many varying in their details. A description of one plant is contained on pages 393–400 of the book "Chemical Process Industries" previously referred to.

One of the available methods of effecting a seal between the basic oxygen vessel and fume hood to exclude air is by means of a nitrogen seal as previously mentioned. Considerable quantities of nitrogen must be available for this purpose and the nitrogen produced in the air separation plant may not be sufficient both for sealing purposes and ammonia production. As a supplemental supply of nitrogen, the present invention therefore utilizes the flue gas evolving from the steam generator 52. The flue gas which is of course rich in nitrogen, is treated in the purifying system 64 in which CO, $CO_2$, fly ash and other impurities are removed. The details of the purifying system form no part of the present invention, and any conventional components may be used such as electrostatic precipitators and the CO and $CO_2$ removal system discussed previously. The nitrogen is then fed to storage tank 66 from which it is fed via lines 68 and 70 to the ammonia synthesis apparatus and basic oxygen converter for sealing as desired. Line 72 is also provided to feed nitrogen from the air separation plant to the basic oxygen converter for sealing as required or desired.

While one preferred embodiment of the invention has been shown and described, it will be understood that such is illustrative rather than restrictive and that changes may be made without departing from the invention as claimed.

I claim:

1. In combination, an oxygen blowing metal refining converter, means for providing a supply of oxygen, means for feeding said oxygen to said metal refining converter wherein said oxygen is reacted to produce an off-gas containing CO, means for collecting said off-gas from said metal refining converter, a reactor, means for feeding water and said off-gas to said reactor wherein said CO in said off-gas and said water are reacted to produce $H_2$, ammonia synthesis apparatus, means for feeding said $H_2$ from said reactor to said ammonia synthesis apparatus and means for feeding $N_2$ to said ammonia synthesis apparatus wherein said $H_2$ and $N_2$ are reacted to produce ammonia.

2. The combination of claim 1 wherein said means for providing a supply of oxygen includes an air separation plant for separating $O_2$ and $N_2$ from air and wherein said means for feeding $N_2$ to said ammonia synthesis apparatus comprises means for feeding said $N_2$ from said air separation apparatus to said ammonia synthesis apparatus.

3. The combination of claim 2 wherein said reactor comprises a CO gas shift reactor and wherein said means for feeding water to said reactor comprises steam generating means.

4. A combination of claim 3 wherein said steam generating means comprises a steam generating fume hood for said oxygen blowing metal refining converter whereby said off-gases will generate at least a portion of said steam.

5. In combination, a basic oxygen converter vessel, air separation means for separating $O_2$ and $N_2$ from the air thereby forming an $O_2$ source and a first $N_2$ source, means for feeding said $O_2$ from said air separation means to said converter vessel whereby said $O_2$ may be blown into said converter vessel and onto said metal to produce an off-gas containing CO, means for collecting said off-gas from said converter vessel, a CO gas shift converter, means for feeding steam and said collected off-gas from said converter vessel to said shift converter whereby said CO and said steam may react in said shift converter to produce $H_2$ and $CO_2$, ammonia synthesis apparatus, means for feeding said $H_2$ produced in said shift converter to said ammonia synthesis apparatus and means for feeding $N_2$ to said ammonia synthesis apparatus wherein said $H_2$ and nitrogen are reacted to produce ammonia.

6. The combination of claim 5 wherein said means for collecting off-gas is sealed with said converter vessel by means of $N_2$ and wherein said means for feeding steam to said CO gas shift converter comprises a fuel-fired steam generator, said steam generator producing a flue gas containing $N_2$, and further including means for substantially separating said $N_2$ from said flue gas thereby forming a second $N_2$ source, and wherein said means for feeding $N_2$ to said ammonia synthesis apparatus includes means for feeding said $N_2$ from at least one of said $N_2$ sources and further including means for feeding $N_2$ from at least one of said $N_2$ sources to said means for collecting off-gas for sealing.

7. The method of claim 5 wherein said steps of providing supplies of $O_2$ and $N_2$ comprise separating said $O_2$ and $N_2$ from air by liquification.

8. A method for producing ammonia from the by-products of a basic oxygen metal refining process which produces off-gas containing CO comprising the steps of providing a supply of $O_2$, feeding said $O_2$ to said refining process, collecting the off-gas from said refining process, mixing steam with said collected off-gases, feeding the mixture of said off-gases and steam to a CO gas shift converter, reacting CO gas and steam in said shift converter to produce $H_2$ and $CO_2$, feeding said $H_2$ from said shift converter to an ammonia synthesis apparatus, providing a supply of $N_2$, feeding said $N_2$ to said ammonia synthesis apparatus and reacting said $N_2$ and $H_2$ to produce ammonia.

References Cited

UNITED STATES PATENTS

| | | | |
|---|---|---|---|
| 2,855,292 | 10/1958 | Vogt | 75—60 |
| 2,955,909 | 10/1960 | Clarke | 23—198 |

OSCAR R. VERTIZ, *Primary Examiner.*

H. S. MILLER, *Assistant Examiner.*